US006881376B2

(12) United States Patent
Song et al.

(10) Patent No.: US 6,881,376 B2
(45) Date of Patent: Apr. 19, 2005

(54) NUCLEAR FUEL BODY INCLUDING TUNGSTEN NETWORK AND METHOD OF MANUFACTURING THE SAME (75) Inventors: Kun Woo Song, Daejeon (KR); Jae Ho Yang, Daejeon (KR); Keon Sik Kim, Daejeon (KR); Ki Won Kang, Daejeon (KR); Jong Hun Kim, Daejeon (KR); Youn Ho Jung, Daejeon (KR)

(73) Assignees: Korea Atomic Energy Research Institute, Daejeon (KR); Korea Hydro & Nuclear Power, Co., Ltd., Seoul (KR)

( * ) Notice: Subject to any disclaimer, the term of this patent is extended or adjusted under 35 U.S.C. 154(b) by 0 days.

(21) Appl. No.: 10/677,681

(22) Filed: Oct. 2, 2003

(65) Prior Publication Data

US 2004/0103752 A1 Jun. 3, 2004

(30) Foreign Application Priority Data

Nov. 28, 2002 (JP) ..................................... 2002-0074805
May 1, 2003 (JP) .................................. 10-2003-0028065

(51) Int. Cl.$^7$ ................................................. B22F 3/00
(52) U.S. Cl. ................................ 419/6; 419/7; 419/19; 419/53; 419/57
(58) Field of Search ........................... 419/6, 7, 19, 53, 419/57

(56) References Cited

U.S. PATENT DOCUMENTS

| | | | | | |
|---|---|---|---|---|---|
| 3,264,222 A | * | 8/1966 | Carpenter et al. | .......... | 252/639 |
| 3,276,867 A | * | 10/1966 | Brite et al. | .................... | 419/15 |
| 3,573,036 A | * | 3/1971 | Fairbanks et al. | .......... | 252/643 |
| 3,579,390 A | * | 5/1971 | Pain et al. | ..................... | 419/32 |
| 3,661,709 A | * | 5/1972 | Chubb et al. | ............... | 376/409 |
| 4,052,330 A | * | 10/1977 | Jensen et al. | ............... | 252/638 |
| 4,383,855 A | * | 5/1983 | Aaron et al. | .................. | 419/19 |
| 5,362,426 A | * | 11/1994 | Hirai et al. | .................. | 264/0.5 |

* cited by examiner

Primary Examiner—Ngoclan T. Mai
(74) Attorney, Agent, or Firm—Bachman & LaPointe, P.C.

(57) ABSTRACT

The present invention relates to a nuclear fuel body comprising tungsten network and a method for manufacturing the same, more particularly, a nuclear fuel body in which tungsten network is continuously formed over the entire or some parts of a sintered body and a method for manufacturing the same. The sintered body in the nuclear fuel body of the present invention contains tungsten network having excellent heat conductivity, leading to the enhancement of heat conductivity of the nuclear fuel sintered body itself with decreasing the temperature of the nuclear fuel, so that it can contribute to the improvement in safety and performance of nuclear fuel.

13 Claims, 5 Drawing Sheets

NUCLEAR FUEL BODY INCLUDING TUNGSTEN NETWORK AND METHOD OF MANUFACTURING THE SAME

FIELD OF THE INVENTION

The present invention relates to a nuclear fuel body comprising tungsten network and a method for manufacturing the same, more particularly, a nuclear fuel body in which tungsten network is continuously formed over the entire or some parts of a sintered body and a method for manufacturing the same.

BACKGROUND

A nuclear power plant utilizes the fission energy produced in nuclear fuel. Tens of-hundreds of fuel bodies composed of nuclear fuel materials are loaded in a zirconium-based tube, which is then seal-welded to fabricate a fuel rod. Tens of-hundreds of fuel rods are assembled to make a bundle and these bundles are loaded in water reactors. Heat generated in the fuel body is transferred through the zirconium-based tube to coolant flowing around the fuel rods.

For a nuclear fuel, cylindrical or spherical shape fuel body fabricated by sintering and processing the individual oxide or the mixture of oxides of uranium(U), plutonium(Pu), thorium(Th), etc are used. Uranium dioxide($UO_2$) is generally used to fabricate a fuel body and one or more materials selected from a group consisting of oxides of Pu, Th, Gd, etc can be added to $UO_2$. Particularly, (U, Pu)$O_2$, (U, Th)$O_2$, (U, Gd)$O_2$, (U, Pu, Gd)$O_2$ or (U, Th, Pu)$O_2$ is preferably used.

Figure 1:
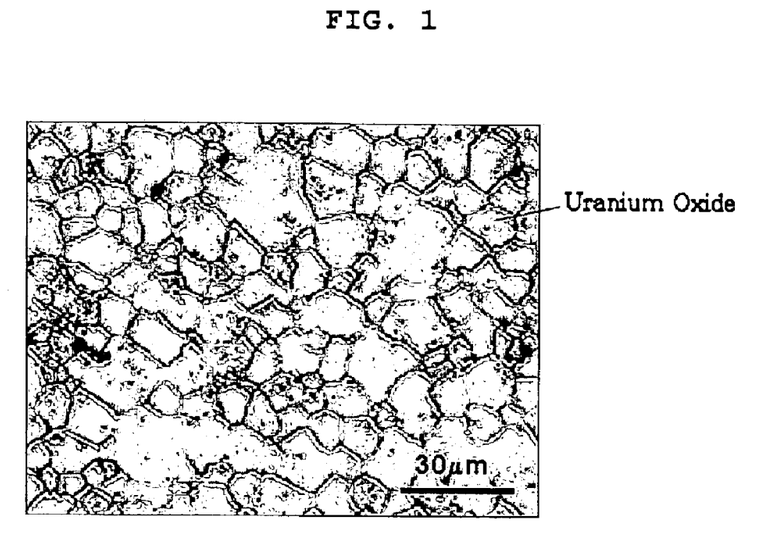
FIG. 1 is an optical microphotograph showing the microstructure of the uranium oxide sintered body provided by the prior art.

The most preferably used nuclear fuel is the uranium oxide sintered body, which is prepared by the steps of mixing lubricant with uranium oxide powder, preparing slug by preliminary processing with 1 ton/cm$^2$ pressure, preparing granules by crushing the slug, pressing the granules into green pellet having about 50% TD (theoretical density), and sintering the green body at 1600–1800° C. for 2–4 hours in hydrogen-containing gas. The produced uranium oxide sintered body has a cylindrical shape and 95% density based on theoretical density. The microstructure of the sintered body is represented in FIG. 1. As shown in FIG. 1, the structure of the sintered body is constructed by polygonal grains having 3~20 μm in diameter.

In like manner, (U,Pu)$O_2$ or (U,Th)$O_2$ sintered body is prepared by mixing plutonium oxide powder or thorium oxide powder with uranium oxide powder and then by following the above steps as used for preparing the uranium oxide sintered body. (U,Gd)$O_2$ sintered body is also prepared by mixing gadolinium oxide powder with uranium oxide powder and then by following the steps as used for preparing the uranium oxide sintered body. In order to grow grains of nuclear fuel sintered body, one or more oxides selected from a group consisting of Nb, Ti, Si, Mg and Al oxides are added to uranium oxide.

$UO_2$ has been generally used as a nuclear fuel material since it has a high melting point and reacts negligibly with coolant(water). But, $UO_2$ has comparatively low thermal conductivity (2~5 W/m K). If a nuclear fuel material has low thermal conductivity, heat generated by nuclear fission cannot be transferred to coolant right away, resulting in an increase in the temperature of fuel body. The temperature of fuel body is highest at the center and lowest at the surface. The difference in temperature between the surface and the center of the sintered body is inversely proportional to thermal conductivity. Therefore, the center temperature of fuel body increases as thermal conductivity decreases. The center temperature of fuel body in normally burning nuclear fuel rods ranges from 1000° C. to 1500° C., but if it is not in a normal operation, the temperature can go over 2800° C., which is the melting point of $UO_2$.

Since the nuclear fuel sintered body keeps high temperature, all the temperature-depending reactions are accelerated, resulting in the lowering of material performance. The higher the burning temperature is, the lower the performance becomes. In addition, a high temperature in sintered body lowers the safety margin in anticipated nuclear power plant accidents. In case of rapid elevation of the generating power of fuel body, the center temperature might increase up to over the melting point of $UO_2$. In order to prevent this problem, the generating power ought to be limited, with suffering an economic loss.

The thermal conductivities of (U,Pu) $O_2$, (U, Gd) $O_2$ or (U,Th)$O_2$ are as good as or worse than that of $UO_2$. Especially, the thermal conductivity of (U,Gd)$O_2$ is much worse than that of $UO_2$, suggesting that the temperature of (U,Gd)$O_2$ sintered body is much higher than that of $UO_2$ sintered body under the condition of having same generating power. To solve the problem, the generating power of (U,Gd)$O_2$ sintered body ought to be more limited than that of $UO_2$ fuel body.

Thus, the present invention prepared a novel nuclear fuel sintered body in which tungsten network having a high melting point and excellent thermal conductivity is continuously formed in order to make up for such disadvantage that the nuclear fuel sintered body has a low thermal conductivity.

SUMMARY OF THE INVENTION

It is an object of this invention to provide a nuclear fuel body containing tungsten network having enhanced thermal conductivity and a preparation method thereof.

BRIEF DESCRIPTION OF THE DRAWINGS

The application of the preferred embodiments of the present invention is best understood with reference to the accompanying drawings, wherein.

DETAILED DESCRIPTION OF PREFERRED EMBODIMENTS

The present invention provides a nuclear fuel body containing tungsten network and a method for manufacturing the same.

Further features of the present invention will appear hereinafter.

The present invention provides a nuclear fuel body comprising fuel grains and tungsten network. Particularly, the nuclear fuel body comprises tungsten network that is continuously formed between fuel grains and thus envelops fuel grains (see FIG. 2).

Figure 2:
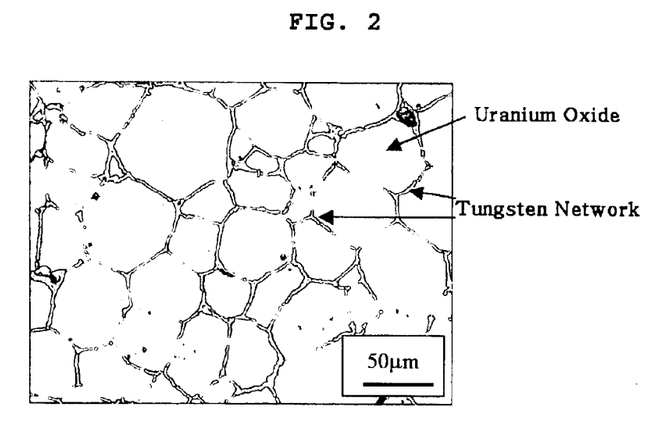
FIG. 2 is an optical microphotograph showing the microstructure of the uranium oxide sintered body comprising tungsten network of the present invention.

As shown in FIG. 2, tungsten network is continuous between fuel grains throughout the entire uranium oxide sintered body and acts as a heat-conducting channel. The lines—metal network—shown in two-dimensional photograph mean the planes in three-dimensions, and the polygons—fuel grains—in two-dimensional photograph are the polyhedrons in three-dimensions. Thus, the metal tungsten has a shape which envelopes the polyhedral grains. As tungsten network is completely formed, nuclear fuel materials are in polyhedral tungsten and such tungsten polyhedrons are continuously gathered together to constitute a sintered body. The sizes of the tungsten polyhedrons are corresponding to those of fuel grains.

The fuel grain size depends on the conditions of its preparation method. The fuel grains become larger as additives are added to nuclear fuel materials. As an additive, Nb, Ti, Al, Si or Mg oxide can be used. The grain size of nuclear fuel sintered body provided by the present invention is between 5 and 500 $\mu$m in diameter in two-dimensional photograph. Thus, the size of one unit of tungsten network is also between 5 and 500 $\mu$m in diameter and the tungsten channel between two neighboring fuel grains has thickness ranging from 0.1 to 20 $\mu$m.

The amount of tungsten in the fuel body increases with increasing the thickness of tungsten channel and with decreasing the size of fuel grain. On the contrary, the amount of nuclear fuel material in sintered body decreases with increasing the amount of tungsten therein and so does the fission energy produced in fuel body, causing a drop in economical efficiency. Therefore, it is desirable to enhance the thermal conductivity of fuel body by a small amount of tungsten. The nuclear fuel sintered body provided by this invention has the amount of tungsten ranging from 0.2 to 50% by weight of fuel body.

The melting point of tungsten is 3400° C. and the melting point of uranium oxide is 2800° C. That is the reason why tungsten is chosen as a network material. Tungsten alloys containing other metals up to about 10% by weight can be used as network materials unless they do not significantly decrease the melting point of tungsten alloys.

The nuclear fuel body of the present invention is characterized by being composed of nuclear fuel materials and tungsten network. Uranium oxide or uranium oxide mixture, prepared by mixing one selected from a group consisting of gadolinium oxide, plutonium oxide and thorium oxide with uranium oxide, can be used for the nuclear fuel material. If tungsten is dispersed in a form of isolated particles with no tungsten network, tungsten cannot act as a heat-conducting channel. The nuclear fuel body of the present invention is characterized by having tungsten network, not by tungsten dispersed in a form of isolated particles.

There are two steps of transferring the heat generated from nuclear fuel materials in the nuclear fuel body of the present invention. The heat generated in the nuclear fuel grains by nuclear fission of uranium is conducted to the neighboring tungsten network through uranium oxide (step 1), and the heat is further conducted through the tungsten network having relatively high thermal conductivity and being continuous throughout the entire sintered body, and thereby the heat generated in the center of the body can be conducted to the surface of the body (step 2). The thermal conductivity of tungsten is higher by 25 times than that of uranium oxide. Thus, the nuclear fuel body of the present invention has enhanced thermal conductivity.

Tungsten network channel is not a line but a plane in three-dimensions, so point damage of a plane does not much degrade the heat conduction through the tungsten channel.

The nuclear fuel body of the present invention includes the tungsten network throughout the entire fuel body. Some variations are possible in the spirit of this invention. The tungsten network can be formed in local regions of the fuel body. Especially, it is possible to prepare a cylindrical fuel body in which an inner cylinder has tungsten network but the outside ring does not. Conversely, it is also possible to prepare a fuel body in which tungsten network is formed only in the outside ring.

In order to supplement the low thermal conductivity of conventional nuclear fuel bodies, every possible factor that might decrease the thermal conductivity have been restricted. Since the nuclear fuel body of the present invention comprises tungsten network, which means heat is conducted through the tungsten network, thermal conductivity does not much affected by the change in the oxygen/uranium ratio and the density of the fuel body. That is, the nuclear fuel body of the present invention can be used in the wide range of oxygen/uranium ratio and density.

The present invention also provides a method for manufacturing a nuclear fuel sintered body containing tungsten network.

Particularly, the present invention provides a preparation method for a nuclear fuel body comprising the following steps:

Preparing a green body composed of nuclear fuel powder and tungsten-containing powder (Step 1);

Preparing a preliminary sintered body, in which tungsten particles are dispersed, by heating the above green body in a reducing gas (Step 2);

Forming liquid tungsten oxide network in the preliminary sintered body by heating the preliminary sintered body in an oxidizing gas (Step 3); and Preparing a nuclear fuel body comprising solid tungsten network by heating in a reducing gas the above preliminary sintered body having liquid tungsten oxide network (Step 4).

The details of the above preparation method are described in the followings.

In the above step 1, a powder mixture is prepared by mixing uniformly fuel powder and tungsten-containing powder. The tungsten-containing powder is one selected from the group consisting of tungsten, tungsten oxide and mixtures thereof. The amount of tungsten-containing powder is between 0.2 and 50% by weight of the powder mixture. And then, a green body is prepared by loading and pressing the power mixture in a mold. For the fuel powder above, uranium oxide or the mixture prepared by mixing uranium oxide and one or more selected from a group consisting of gadolinium oxide, plutonium oxide and thorium oxide can be used. The tungsten-containing powder can include other metal elements less than 10% by weight of tungsten.

In step 2, a preliminary sintered body is prepared by heating the green body at 1,100~2,000° C. in a reducing gas. As a reducing gas that is able to reduce tungsten oxide to tungsten, hydrogen gas or gas mixture prepared by mixing hydrogen gas and one or more selected from a group consisting of nitrogen, inert gas, carbon dioxide, carbon monoxide and steam can be used.

Figure 3:
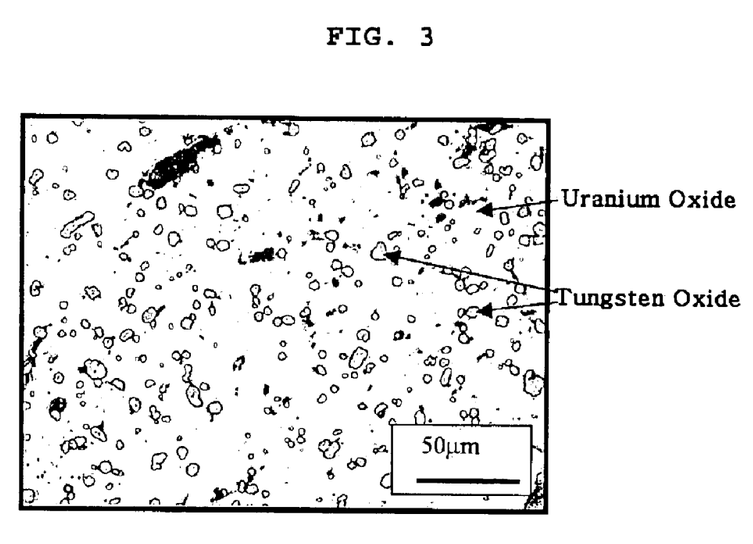
FIG. 3 is an optical microphotograph showing the microstructure of the preliminary sintered body in which tungsten particles are uniformly dispersed.

When uranium oxide is used as fuel powder, the preliminary sintered body has such microstructure that metal tungsten is uniformly dispersed in a form of isolated particles in $UO_2$ matrix (see FIG. 3). The preliminary sintered body, thus, does not have a good thermal conductivity since tungsten that is dispersed in a form of particles cannot act as a heat-conducting channel.

In step 3, liquid network of tungsten oxide is formed in the fuel body by heating the preliminary sintered body in an oxidizing gas that is able to oxidize tungsten to tungsten oxide ($WO_3$). At this time, the heating temperature is 1,100~1,800° C. and the oxidizing gas ought to be a gas which has oxygen partial pressure controlled at least to oxidize tungsten to tungsten oxide. The oxygen partial pressure of the oxidizing gas is calculated from the free energy of tungsten oxidation reaction. Tungsten oxide includes $WO_3$ and $WO_2$ and the oxidation reaction is expressed by the following <Reaction Formula 1>.

Reaction Formula 1

$$\tfrac{2}{3}W + O_2(g) \rightarrow \tfrac{2}{3}WO_3$$

$$W + O_2(g) \rightarrow WO_2$$

The relation between the Gibbs free energy and oxygen partial pressure is expressed by the following <Reaction Formula 2>.

Reaction Formula 2

$$\Delta G^0(T) = -RT \ln K = RT \ln P_{O2}$$

In the above reaction formula, $\Delta G^0(T)$ is the Gibbs free energy, R is the gas constant, T is the absolute temperature, K is the reaction constant, and $P_{O2}$ is the equilibrium oxygen partial pressure.

Figure 4:
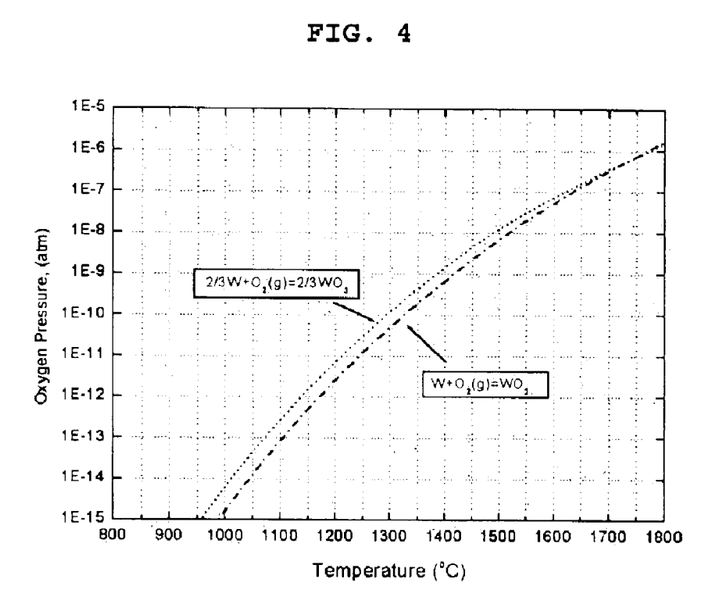
FIG. 4 is a graph showing the oxygen partial pressure for tungsten oxidation.
Figure 5:
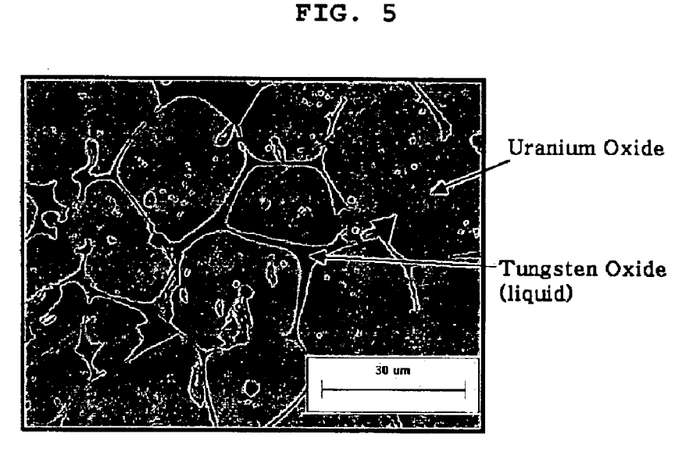
FIG. 5 is an optical microphotograph showing the microstructure of the network of liquid tungsten oxide obtained by heat-treatment of the preliminary sintered body in the presence of an oxidizing gas.

The Gibbs free energy ($\Delta G^0(T)$) is well known as a function of temperature, so the $RT \ln P_{O2}$ can be calculated based on that. Equilibrium oxygen partial pressure is calculated from $RT \ln P_{O2}$, which is represented in FIG. 4 as a function of temperature. When the oxidizing gas having higher oxygen partial pressure than the equilibrium oxygen partial pressure between W and $WO_3$ is used at the heating process, tungsten is oxidized to tungsten oxide ($WO_3$). The melting point of $WO_3$ is about 1480° C. So, when an oxidizing gas has higher oxygen partial pressure than required for forming $WO_3$ and the heating temperature is over 1480° C., the liquid tungsten oxide can be obtained. Liquid tungsten oxide penetrates into the grain boundary of uranium oxide and thus forms network of liquid $WO_3$, which is confirmed by investigating the microstructure of preliminary sintered body (see FIG. 5). As shown in FIG. 5, $WO_3$ is formed between polygonal grains, suggesting that network of liquid tungsten oxide is formed in the preliminary sintered body.

On the other hand, it is also observed that tungsten oxide reacts with uranium oxide to form (uranium+tungsten) oxide. This (uranium+tungsten) oxide melts even under 1480° C. and then penetrates into the grain boundary of fuel to form network of liquid tungsten oxide, so the microstructure of the sintered body is similar to that shown in FIG. 5.

The heating temperature for the preliminary sintered body is preferably over 1100° C. and the oxygen partial pressure of an oxidizing gas is required to be higher than the equilibrium oxygen partial pressure of W and $WO_3$ reaction.

In order to regulate the oxygen partial pressure of an oxidizing gas, carbon dioxide or steam is used, or one or more methods selected from a group consisting of regulating the mixing ratio of carbon dioxide to carbon monoxide, mixing ratio of hydrogen to steam, mixing ratio of hydrogen to carbon dioxide, mixing ratio of inert gas or nitrogen to oxygen, etc., can be further used.

At last, in step 4, a nuclear fuel body comprising solid tungsten network is prepared by heating the above preliminary sintered body having liquid tungsten oxide network in a reducing gas. At this time, the heating temperature is 1,100~2,000° C. The liquid tungsten oxide reduces to solid tungsten by heating in a reducing gas the preliminary sintered body having liquid tungsten oxide network, which results in the preparation of a nuclear fuel body comprising solid tungsten network. It is preferable that the oxygen partial pressure of the reducing gas is lower than the equilibrium oxygen partial pressure of W and $WO_2$ reaction shown in FIG. 4. The reducing gas is hydrogen and further comprises one selected from a group consisting of nitrogen, inert gas, carbon dioxide, carbon monoxide, steam and mixtures thereof.

The above preparation method provides a fuel body comprising the tungsten network throughout the entire fuel body. The green body that consists of the uniform powder mixture of fuel and tungsten-containing powder is processed according to the steps 2 to 4. However, an inhomogeneous green body can be processed according to the steps 2 to 4, because liquid tungsten oxide can penetrate into a long distance over the entire body if a sufficient time is provided for the heating in the step 3. Thus, even a green body in which tungsten-containing powder is extremely segregated can also lead to the same fuel body comprising tungsten network according to the same procedures of the above steps 2 to 4. Two cases are described where the tungsten-containing powder is located in the center and at the surface of the green body.

Firstly, in step 1 a green body in which tungsten-containing powder is located in the center and fuel powder is located in the surroundings is prepared. And then, a nuclear fuel body is prepared using the green body according to the same procedures of the above steps 2–4. In step 2, a preliminary sintered body contains tungsten particles in the center. In step 3, tungsten is oxidized to tungsten oxide and liquid tungsten oxide penetrates into grain boundaries of the surrounding uranium oxide, forming eventually a network of liquid tungsten oxide over the entire body. In step 4, the network of liquid tungsten oxide is reduced to tungsten network. As a result, a sintered body in which tungsten network is continuously formed through the entire body is prepared.

Secondly, in step 1 a green body is prepared by pressing the fuel powder only, and then the tungsten-containing powder, confined by a cap, is put on the surface of the green body. In step 2, a preliminary sintered body where tungsten particles adhere to its surface is prepared by heating the green body in a reducing gas. After then, a nuclear fuel body is prepared using the preliminary sintered body according to the same procedures of the above steps 3–4. The preliminary sintered body prepared in the above step 2 has tungsten particles adhered to the surface, which are oxidized in step 3. Liquid tungsten oxide on the surface penetrates into grain boundaries of the preliminary sintered body to form liquid network continuously through the entire body. At last, in step 4, the liquid network of tungsten oxide reduces to solid tungsten network. As a result, a nuclear fuel body containing tungsten network that is formed throughout the entire fuel body is prepared.

The method for manufacturing a nuclear fuel body of the present invention can provide a possible way to form tungsten network not only throughout the entire body but also in local regions. For example, it is possible to prepare a cylindrical fuel body in which an inner cylinder has tungsten network but the outside ring does not. Conversely, it is also possible to prepare a fuel body in which tungsten network is formed only in the outside ring. Particularly, to manufacture the fuel body having the tungsten network only in the inner cylinder, the powder mixture of uranium oxide and tungsten-containing powder is loaded in the inner cylinder void of a mold and uranium oxide powder is loaded in the outside ring void, and thereafter powders are pressed in a mold. Then a preliminary sintered body is prepared by sintering the said green body in a reducing gas. Tungsten particles are present in uranium oxide matrix of the inner cylinder part of the preliminary sintered body but not in outside ring. By heating the preliminary sintered body in an oxidizing gas in accordance with the preparation method of the present invention, tungsten network is formed in inner cylinder of the sintered body, but not in outside ring. When the positions of both powders are changed each other, tungsten network is formed in outside ring, but not in inner cylinder.

EXAMPLES

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

Preparation of a Nuclear Fuel Sintered Body

Tungsten powder was added to uranium oxide powder in the quantity of 9% by weight, and then two powders were mixed. The powder mixture was loaded in a cylindrical mold, and then pressed under 3 t/cm$^2$ to make a green body. The green body was sintered at 1700° C. for 4 hours in hydrogen gas to make a preliminary sintered body. The preliminary sintered body was heated at 1480° C. for 1.5 hours in carbon dioxide gas. Finally, the above preliminary sintered body was reduced at 1650° C. in hydrogen gas for 2 hours to produce the nuclear fuel body.

EXPERIMENTAL EXAMPLE 1

Investigation on Microstructure of the Nuclear Fuel Body

The microstructure of the nuclear fuel body produced in the above Example 1 was investigated by an optical microscope (200–500× magnification). The results were shown in FIGS. 2, 3 and 5.

FIG. 2 shows the microstructure of the nuclear fuel body comprising tungsten network produced by heating the preliminary sintered body containing liquid tungsten oxide network in a reducing gas. It is confirmed that tungsten network is continuously formed in the entire sintered body and the tungsten network acts-as a channel for heat conduction.

FIG. 3 shows the microstructure of the preliminary sintered body in which tungsten particles are dispersed uniformly. The tungsten particles are not connected but scattered, so they do not act as a channel for heat conduction, suggesting that the body has low thermal conductivity.

FIG. 5 shows the microstructure of the preliminary sintered body comprising liquid tungsten oxide network and uranium oxide grains. Heating the preliminary sintered body in an oxidizing gas produces this microstructure. It is confirmed that $WO_3$ is formed between polygonal grains and liquid tungsten oxide network is formed in entire sintered body.

EXPERIMENTAL EXAMPLE 2

Measurement of the Thermal Diffusivity of the Nuclear Fuel Body

The thermal diffusivity of the nuclear fuel body prepared in the above Example 1 was measured by the laser flash method, and the thermal diffusivity of the pure uranium oxide body was also measured for comparison. The results are shown in Table 1.

TABLE 1

Thermal diffusivity of nuclear fuel body comprising tungsten network

| Temperature (° C.) | Thermal diffusivity ($\times 10^{-6}$ m$^2$/sec) Nuclear fuel body comprising tungsten network (A) | Pure uranium oxide body (B) | Ratio of A to B (A/B) |
|---|---|---|---|
| 22 | 5.271 | 3.617 | 1.46 |
| 200 | 4.450 | 2.772 | 1.61 |
| 400 | 3.282 | 1.945 | 1.69 |
| 600 | 2.629 | 1.487 | 1.77 |
| 800 | 2.239 | 1.238 | 1.81 |
| 1000 | 1.978 | 1.085 | 1.82 |
| 1200 | 1.778 | 0.956 | 1.86 |
| 1400 | 1.619 | 0.879 | 1.84 |

As shown in Table 1, the thermal diffusivity of the nuclear fuel body comprising tungsten network of the present invention was higher by 70–80% than that of the pure uranium oxide body. Particularly, the enhanced ratio (A/B) of thermal diffusivity was 1.46–1.86 at 22–1200° C.

INDUSTRIAL APPLICABILITY

As explained hereinbefore, the nuclear fuel body in which tungsten network is continuously formed between grains throughout the entire body or in some specific regions can contribute to enhance the safety of a nuclear reactor by enhancing the thermal conductivity of the fuel body and decreasing the temperature of burning fuel body.

What is claimed is:

1. A preparation method of the nuclear fuel body comprising the following steps:
    (1) Preparing a green body composed of nuclear fuel powder and tungsten-containing powder (Step 1);
    (2) Preparing a preliminary sintered body, in which tungsten particles are dispersed, by heating the above green body in a reducing gas (Step 2);
    (3) Forming liquid tungsten oxide network in the preliminary sintered body by heating in an oxidizing gas (Step 3); and
    (4) Preparing a nuclear fuel body comprising solid tungsten network by heating in a reducing gas the above preliminary sintered body having a liquid tungsten oxide network (Step 4).

2. The preparation method of the nuclear fuel body as set forth in claim 1, wherein the step 1 further includes preparing a powder mixture by mixing fuel powder and tungsten-containing powder, and making a green body by loading and pressing the powder mixture in a mold.

3. The preparation method of the nuclear fuel body as set forth in claim 1, wherein the step 1 further includes loading the tungsten-containing powder in the center and the fuel powder in the surroundings, and pressing to make a green body.

4. The preparation method of the nuclear fuel body as set forth in claim 1, wherein the green body is prepared by loading and pressing the fuel powder only and then putting the tungsten-containing powder, confined by a cap, on the surface of the green body in step 1, and the preliminary sintered body where tungsten particles adhere to the surface is prepared by heating the green body in a reducing gas in step 2.

5. The preparation method of the nuclear fuel body as set forth in claim 1, wherein the heating temperature of step 2 is 1100–2000° C.

6. The preparation method of the nuclear fuel body as set forth in claim 1, wherein the reducing gas is hydrogen and further includes one selected from a group consisting of nitrogen, inert gas, carbon dioxide, carbon monoxide, steam and mixtures thereof.

7. The preparation method of the nuclear fuel body as set forth in claim 1, wherein the heating temperature of step 3 is 1100–1800° C.

8. The preparation method of the nuclear fuel body as set forth in claim 1, wherein the oxidizing gas is one selected from a group consisting of carbon dioxide, steam and a mixed gas selected from a group consisting of a mixed gas of carbon dioxide and carbon monoxide, a mixed gas of hydrogen and steam, a mixed gas of hydrogen and carbon dioxide, a mixed gas of inert gas and oxygen, and a mixed gas of nitrogen and oxygen.

9. The preparation method of the nuclear fuel body as set forth in claim 1, wherein the heating temperature of step 4 is 1100–2000° C.

10. The preparation method of the nuclear fuel body as set forth in claim 1, wherein the nuclear fuel powder is uranium oxide or the mixture prepared by mixing uranium oxide and one or more selected from a group consisting of plutonium oxide, thorium oxide and gadolinium oxide.

11. The preparation method of the nuclear fuel body as set forth in claim 1, wherein the tungsten-containing powder is one selected from the group consisting of tungsten powder, tungsten oxide powder and mixtures thereof.

12. The preparation method of the nuclear fuel body as set forth in claim 1, wherein the step 1 further includes preparing a powder mixture by mixing fuel powder and tungsten-containing powder, loading the powder mixture in the inner cylinder void of a mold and the fuel powder only in the outside ring void, and making a green body by pressing the powders in a mold.

13. The preparation method of the nuclear fuel body as set forth in claim 1, wherein the amount of the tungsten-containing powder is between 0.2 and 50% by weight of the green body.

* * * * *